United States Patent
Milliman et al.

(10) Patent No.: US 11,713,406 B2
(45) Date of Patent: Aug. 1, 2023

(54) MULTILAYER TAPE

(71) Applicant: Avery Dennison Corporation, Glendale, CA (US)

(72) Inventors: Henry W. Milliman, Willoughby, OH (US); Joseph L. Meckler, Cleveland, OH (US); Mahesh Ganesan, Beachwood, OH (US); Luke N. Johnson, Painesville, OH (US)

(73) Assignee: Avery Dennison Corporation, Mentor, OH (US)

( * ) Notice: Subject to any disclaimer, the term of this patent is extended or adjusted under 35 U.S.C. 154(b) by 582 days.

(21) Appl. No.: 16/330,643

(22) PCT Filed: Sep. 20, 2017

(86) PCT No.: PCT/US2017/052419
§ 371 (c)(1),
(2) Date: Mar. 5, 2019

(87) PCT Pub. No.: WO2018/057570
PCT Pub. Date: Mar. 29, 2018

(65) Prior Publication Data
US 2021/0277285 A1 Sep. 9, 2021

Related U.S. Application Data

(60) Provisional application No. 62/397,073, filed on Sep. 20, 2016.

(51) Int. Cl.
*C09J 7/28* (2018.01)
*C09J 7/29* (2018.01)
(Continued)

(52) U.S. Cl.
CPC . *C09J 7/28* (2018.01); *C09J 7/29* (2018.01); *C09J 7/383* (2018.01); *C09J 7/385* (2018.01);
(Continued)

(58) Field of Classification Search
CPC . B29C 59/046; B29C 65/106; B29C 66/1122; B29C 66/45; B29C 66/71;
(Continued)

(56) References Cited

U.S. PATENT DOCUMENTS 2,819,032 A 1/1958 Detrie et al.
3,087,571 A 4/1963 Kerwin, Jr.
(Continued)

FOREIGN PATENT DOCUMENTS

CN 1693350 11/2005
CN 101125904 2/2008
(Continued)

OTHER PUBLICATIONS

International Search Report and Written Opinion dated Jul. 25, 2019 issued in corresponding IA No. PCT/US2019/032421 filed May 15, 2019.
(Continued)

*Primary Examiner* — Patricia L. Nordmeyer

(57) ABSTRACT

Vibration damping viscoelastic damping material laminates are described. The tapes generally include at least two viscoelastic damping material layers and at least one substrate. The tapes may optionally include one or more release liners. Also described are constrained layer systems formed by adhering the tape to a first substrate and/or second substrate undergoing vibration.

31 Claims, 6 Drawing Sheets

(51) Int. Cl.
*C09J 7/38* (2018.01)
*F16F 9/30* (2006.01)
*C09J 7/40* (2018.01)

(52) U.S. Cl.
CPC ............. *C09J 7/40* (2018.01); *F16F 9/306* (2013.01); *C09J 2203/00* (2013.01); *C09J 2301/1242* (2020.08); *C09J 2301/302* (2020.08); *C09J 2400/163* (2013.01); *C09J 2409/00* (2013.01); *C09J 2433/00* (2013.01); *C09J 2483/00* (2013.01); *Y10T 428/1476* (2015.01)

(58) Field of Classification Search
CPC ............ B29C 66/727; B29C 66/729; B29C 66/83413; B29C 66/83415; B32B 5/026; B32B 5/18; B32B 5/245; B32B 27/40; B32B 33/00; B32B 37/06; B32B 38/06; B32B 3/266; B32B 3/30; B32B 5/022; B32B 7/12; B32B 27/12; B32B 27/283; B32B 37/02; B32B 37/04; B32B 38/10; B32B 2255/02; B32B 2255/26; B32B 2266/0264; B32B 2266/0278; B32B 2305/022; B32B 2305/18; B32B 2307/54; B32B 2307/732; B32B 2307/734; B32B 2310/0445; B32B 2375/00; B32B 2605/003; B32B 27/065; D06N 3/0043; D06N 3/0065; D06N 3/0077; D06N 3/0095; D06N 3/0097; D06N 3/14; D06N 3/183; D06N 2205/04; D06N 2211/263; D06N 2211/28; D06N 3/145; B29L 2007/001; B29L 2009/00
See application file for complete search history.

(56) References Cited

U.S. PATENT DOCUMENTS

| | | | |
|---|---|---|---|
| 3,160,549 A | 12/1964 | Caldwell et al. | |
| 3,476,209 A | 11/1969 | Cohen | |
| 4,340,437 A | 7/1982 | Rogers | |
| 4,447,493 A | 5/1984 | Driscoll et al. | |
| 4,576,850 A | 3/1986 | Martens | |
| 4,742,107 A | 5/1988 | Statz | |
| 4,859,523 A | 8/1989 | Endoh et al. | |
| 5,063,098 A * | 11/1991 | Niwa | E04B 9/045 428/76 |
| 5,262,232 A | 11/1993 | Wilfong et al. | |
| 5,356,715 A | 10/1994 | Levine et al. | |
| 5,474,840 A | 12/1995 | Landin | |
| 5,593,759 A | 1/1997 | Vargas et al. | |
| 5,618,859 A | 4/1997 | Maeyama et al. | |
| 5,670,006 A | 9/1997 | Wilfong et al. | |
| 5,712,038 A | 1/1998 | Yamazaki et al. | |
| 5,851,327 A | 12/1998 | Landin | |
| 5,858,521 A | 1/1999 | Okuda et al. | |
| 6,054,007 A | 4/2000 | Boyd et al. | |
| 6,147,150 A | 11/2000 | Ohira et al. | |
| 6,207,272 B1 | 3/2001 | Takahira et al. | |
| 6,245,419 B1 | 6/2001 | Hakotani et al. | |
| 6,296,979 B1 | 10/2001 | Morita et al. | |
| 6,315,851 B1 | 11/2001 | Mazurek et al. | |
| 6,420,447 B1 | 7/2002 | Kittel et al. | |
| 6,576,316 B2 | 6/2003 | Simons et al. | |
| 6,790,520 B1 * | 9/2004 | Todd | B60R 13/02 428/318.4 |
| 6,863,629 B2 | 3/2005 | Falone et al. | |
| 6,953,105 B2 | 10/2005 | Rust et al. | |
| 7,176,258 B2 | 2/2007 | Morihiro et al. | |
| 7,241,837 B2 | 7/2007 | Yaguchi et al. | |
| 7,253,218 B2 | 8/2007 | Hussaini et al. | |
| 7,368,494 B2 | 5/2008 | Morihiro et al. | |
| 7,624,762 B2 | 12/2009 | Cohen et al. | |
| 7,713,604 B2 | 5/2010 | Yang et al. | |
| 7,812,107 B2 | 10/2010 | Numazawa et al. | |
| 7,973,106 B2 | 7/2011 | Fisk et al. | |
| 8,028,800 B2 | 10/2011 | Ravnaas | |
| 8,268,440 B2 | 9/2012 | Takata et al. | |
| 8,562,850 B2 | 10/2013 | Miyawaki et al. | |
| 8,609,763 B2 | 12/2013 | Sugimae et al. | |
| 8,664,286 B2 | 3/2014 | Yasui et al. | |
| 8,796,164 B2 * | 8/2014 | Restuccia | B32B 5/022 442/247 |
| 8,877,848 B1 | 11/2014 | Wang et al. | |
| 9,080,040 B2 | 7/2015 | Fonseca et al. | |
| 9,186,869 B2 | 11/2015 | Hauber et al. | |
| 9,211,176 B2 | 12/2015 | Natarajan et al. | |
| 9,536,513 B2 | 1/2017 | Wulff et al. | |
| 9,566,722 B2 | 2/2017 | Sitti et al. | |
| 9,626,952 B2 | 4/2017 | Miyawaki et al. | |
| 10,119,589 B2 | 11/2018 | Schaedler et al. | |
| 10,160,404 B2 | 12/2018 | Miyashita et al. | |
| 2004/0222055 A1 | 11/2004 | Niwa et al. | |
| 2007/0088121 A1 | 4/2007 | Miyawaki et al. | |
| 2007/0197713 A1 | 8/2007 | Miyawaki et al. | |
| 2008/0102240 A1 | 5/2008 | Serra et al. | |
| 2008/0251201 A1 | 10/2008 | Sikkel et al. | |
| 2009/0047500 A1 | 2/2009 | Maeda | |
| 2009/0065299 A1 * | 3/2009 | Vito | B32B 3/30 428/221 |
| 2009/0148712 A1 | 6/2009 | Xiao | |
| 2009/0183821 A1 | 7/2009 | Schroeder et al. | |
| 2010/0190916 A1 | 7/2010 | Takata et al. | |
| 2011/0060066 A1 | 3/2011 | Yokota et al. | |
| 2012/0085961 A1 | 4/2012 | Rogunova et al. | |
| 2012/0193180 A1 | 8/2012 | Kawaguchi et al. | |
| 2013/0035412 A1 | 2/2013 | Schmitz et al. | |
| 2013/0178558 A1 | 7/2013 | Rousse et al. | |
| 2013/0196105 A1 | 8/2013 | Karlsen | |
| 2014/0061976 A1 | 3/2014 | Doersam et al. | |
| 2014/0224577 A1 | 8/2014 | Pathak et al. | |
| 2014/0363610 A1 | 12/2014 | Sameoto | |
| 2015/0004346 A1 | 1/2015 | Daley | |
| 2015/0004405 A1 | 1/2015 | Clapper et al. | |
| 2015/0183975 A1 | 7/2015 | Clapper et al. | |
| 2015/0218404 A1 | 8/2015 | Bowles | |
| 2016/0017902 A1 | 1/2016 | Castillo et al. | |
| 2016/0264818 A1 | 9/2016 | Peterson et al. | |
| 2016/0309260 A1 | 10/2016 | Bohm et al. | |
| 2017/0240783 A1 | 8/2017 | Bartholomew et al. | |
| 2018/0156296 A1 | 6/2018 | Alexander et al. | |

FOREIGN PATENT DOCUMENTS

| | | |
|---|---|---|
| CN | 101400739 | 4/2009 |
| CN | 101402800 | 4/2009 |
| CN | 101463167 | 6/2009 |
| CN | 101463232 | 6/2009 |
| CN | 102424714 | 4/2012 |
| CN | 102443332 | 5/2012 |
| CN | 102492378 | 6/2012 |
| CN | 102558840 | 7/2012 |
| CN | 102604239 | 7/2012 |
| CN | 102952294 | 3/2013 |
| CN | 102977416 | 3/2013 |
| CN | 102977482 | 3/2013 |
| CN | 103013384 | 4/2013 |
| CN | 103086319 | 5/2013 |
| CN | 103289137 | 9/2013 |
| CN | 103387715 | 11/2013 |
| CN | 103554924 | 2/2014 |
| CN | 103724908 | 4/2014 |
| CN | 104004305 | 8/2014 |
| CN | 104015406 | 9/2014 |
| CN | 104118151 | 10/2014 |
| CN | 104650403 | 5/2015 |
| CN | 104673009 | 6/2015 |
| CN | 104693518 | 6/2015 |
| CN | 104877191 | 9/2015 |
| CN | 105273245 | 1/2016 |
| CN | 105315515 | 2/2016 |
| CN | 105384888 | 3/2016 |

(56) References Cited

FOREIGN PATENT DOCUMENTS

| | | |
|---|---|---|
| CN | 105754235 | 7/2016 |
| CN | 105936741 | 9/2016 |
| CN | 106084867 | 11/2016 |
| CN | 106284913 | 1/2017 |
| CN | 106543500 | 3/2017 |
| CN | 106715558 | 5/2017 |
| CN | 106866896 | 6/2017 |
| CN | 106867060 | 6/2017 |
| CN | 206734213 U | 12/2017 |
| CN | 108016375 | 5/2018 |
| EP | 0255332 | 2/1988 |
| EP | 0335642 | 10/1989 |
| EP | 405300 | 11/1994 |
| EP | 728166 | 8/1996 |
| EP | 0770190 | 7/1999 |
| EP | 1002008 | 3/2002 |
| EP | 1658966 | 5/2006 |
| EP | 1714997 | 10/2006 |
| EP | 1987089 | 11/2008 |
| EP | 2164901 | 3/2010 |
| EP | 2420412 | 7/2013 |
| EP | 2798006 | 11/2014 |
| EP | 2922896 | 9/2015 |
| EP | 3052538 | 8/2016 |
| EP | 3080175 | 10/2016 |
| EP | 3089472 | 11/2016 |
| EP | 2554091 | 3/2017 |
| EP | 3030591 | 6/2017 |
| EP | 3194483 | 7/2017 |
| EP | 2464513 | 11/2017 |
| JP | 51-093770 | 8/1976 |
| JP | 51-106190 | 9/1976 |
| JP | 51-106910 | 9/1976 |
| JP | 02-084329 | 3/1990 |
| JP | 05-318644 | 12/1993 |
| JP | 06-73935 | 9/1994 |
| JP | 07-71519 | 3/1995 |
| JP | 07-51339 | 6/1995 |
| JP | 07-196992 | 8/1995 |
| JP | 08-34089 | 2/1996 |
| JP | 08-170688 | 7/1996 |
| JP | 10-503575 | 3/1998 |
| JP | 2004-286210 | 10/2004 |
| JP | 2007-127908 | 5/2007 |
| JP | 2010526916 | 8/2010 |
| JP | 2011-089547 | 5/2011 |
| JP | 2013181155 | 9/2013 |
| JP | 2014109023 | 6/2014 |
| JP | 2014162810 | 9/2014 |
| JP | 2014-529525 | 11/2014 |
| JP | 2014224180 | 12/2014 |
| JP | 2015160903 | 9/2015 |
| JP | 2016056279 | 4/2016 |
| JP | 2016141800 | 8/2016 |
| JP | 2017039864 | 2/2017 |
| JP | 2017082171 | 5/2017 |
| KR | 1020130096623 | 8/2013 |
| TW | 201004991 | 2/2010 |
| TW | 201309762 | 3/2013 |
| TW | 201341475 | 10/2013 |
| TW | 201602231 | 1/2016 |
| WO | 96/04490 | 2/1996 |
| WO | 03/022568 | 3/2003 |
| WO | 2012010844 | 1/2012 |
| WO | 2015/111786 | 7/2015 |
| WO | 2016048780 | 3/2016 |
| WO | 2016093339 | 6/2016 |
| WO | 2017094266 | 6/2017 |
| WO | 2018/657570 | 3/2018 |
| WO | 2018/142370 | 8/2018 |

OTHER PUBLICATIONS

International Preliminary Report on Patentability dated Nov. 17, 2020 issued in corresponding IA No. PCT/US2019/032421 filed May 15, 2019.
Gilieo, Dr. Ken, et al. "Thermoplastic Adhesives—The Attachment Solution for Multichip Modules." IEPS, Sep. 1993, pp. 232-242.
Kinloch, A.J. "Toughening Epoxy Adhesives to Meet Today's Challenges." Materials Research Society Bulletin, vol. 28, 2003, pp. 445-448.
International Search Report and Written Opinion issued in corresponding IA No. PCT/US2018/023119 dated Dec. 21, 2018.
Pattantyus-Abraham et al. "Recent Advances in Nanostructured Biomimetic Dry Adhesives", Front Bioeng Biotechnol, 2013, vol. 1, 22.
International Search Report and Written Opinion issued in corresponding IA No. PCT/US2017/052419 dated Jan. 8, 2018.
International Report on Patentability issued in corresponding IA No. PCT/US2017/052419 dated Apr. 4, 2019.
International Preliminary Report on Patentability dated Sep. 22, 2020 issued in corresponding IA No. PCT/US2018/023119 filed Mar. 19, 2018.
Chen et al., "Research Progress in Gradient Polymer Materials," Materials Reports, vol. 20, Issue 9, pp. 59-61, Sep. 2006.
Wang et al, "Common Knowledge: Metal Materials and the Heat Treatment Thereof," p. 217, Feb. 2009.
Japanese Industrial Standards JIS G3141:2017.
Japanese Opposition No. 2022-700807 filed against JP Patent No. 7022118, 38 pages.
Li et al., "Structural Mechanical Property Analysis of Embedded Co-Cured Damping Composites," Chinese Master's Theses Full-text Database, Engineering Science and Technology, vol. 1, Issue 6, Jun. 2016, p. 63.
Li et al., "Dynamic Property Analysis of Embedded Co-Cured Gridded Damping Structure Composites," Journal of Ordnance Equipment Engineering, vol. 37, No. 3, Mar. 2016, pp. 132-137.

* cited by examiner

MULTILAYER TAPE

The present application is a 371 of International Application No. PCT/US17/52419, which was published in English on Mar. 29, 2018, and claims the benefit of U.S. Provisional Patent Application No. 62/397,073 filed Sep. 20, 2016, both of which are incorporated herein by reference in their entireties.

FIELD

The present subject matter relates to tapes, including adhesive tapes, for damping vibration.

BACKGROUND

Vibration damping adhesive tapes are well known in the art. However, in order to achieve desired vibration damping characteristics, most such adhesive tapes are relatively thick, utilize large amounts of adhesive, and/or significantly add to the overall weight of the system or assembly undergoing vibration. Accordingly, a need remains for adhesive tapes that effectively dampen or reduce vibration and which are relatively thin and/or lightweight.

SUMMARY

The difficulties and drawbacks associated with previous approaches are addressed in the present subject matter as follows.

In one aspect, the present subject matter provides a tape for damping vibration. The tape comprises a substrate defining a first face and an oppositely directed second face. The tape also comprises a first layer of viscoelastic damping material at least partially disposed on the first face of the substrate. The tape additionally comprises a second layer of viscoelastic damping material at least partially disposed on the second face of the substrate. The substrate may have a thickness within a range of from about 5 µm to about 3,000 µm, and each of the layers of viscoelastic damping materials has a thickness within a range of from about 2 µm to about 5,000 µm.

In another aspect, the present subject matter provides a tape for damping vibration. The tape comprises a first substrate and a second substrate. The tape also comprises a first layer of viscoelastic damping material at least partially disposed between the first substrate and the second substrate. Further, the tape additionally comprises a second layer of viscoelastic damping material. The second substrate is at least partially disposed between the first layer of viscoelastic damping material and the second layer of viscoelastic damping material. Each of the first substrate and the second substrate has a thickness within a range of from about 5 µm to about 3,000 µm. And each of the first layer of viscoelastic damping materials and the second layer of viscoelastic damping materials has a thickness within a range of from about 2 µm to about 5,000 µm.

In yet another aspect, the present subject matter provides a constrained layer system comprising at least one of a first component and a second component (also referred to as a surface) undergoing vibration. The first component and/or second component may be comprised of any material requiring damping, including but not limited to, metals, plastics, and wood. The tape described herein is at least partially disposed between the first component and the second component. The system also comprises a vibration damping tape including (i) a substrate defining a first face and an oppositely directed second face, (ii) a first layer of viscoelastic damping material at least partially disposed on the first face of the substrate, and (iii) a second layer of viscoelastic damping material at least partially disposed on the second face of the substrate. The substrate has a thickness within a range of from about 5 µm to about 3,000 µm, and each of the viscoelastic damping material layers has a thickness within a range of from about 2 µm to about 5,000 µm. At least one of the first layer of viscoelastic damping material and the second layer of viscoelastic damping material is adhered to at least one of the first component and the second component.

In still another aspect, the present subject matter provides a constrained layer system comprising at least one of the first component and the second component undergoing vibration. The system also comprises a vibration damping tape including (i) a first substrate, (ii) a second substrate, (iii) a first layer of viscoelastic damping material at least partially disposed between the first substrate and the second substrate, and (iv) a second layer of viscoelastic damping material wherein the second substrate is at least partially disposed between the first layer of viscoelastic damping material and the second layer of viscoelastic damping material. Each of the first substrate and the second substrate has a thickness within a range of from about 5 µm to about 3,000 µm. And each of the first layer of viscoelastic damping material and the second layer of viscoelastic damping material has a thickness within a range of from about 2 µm to about 5,000 µm. At least one of the first layer of viscoelastic damping material and the second layer of viscoelastic damping material is at least partially adhered to at least one of the first component and the second component.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
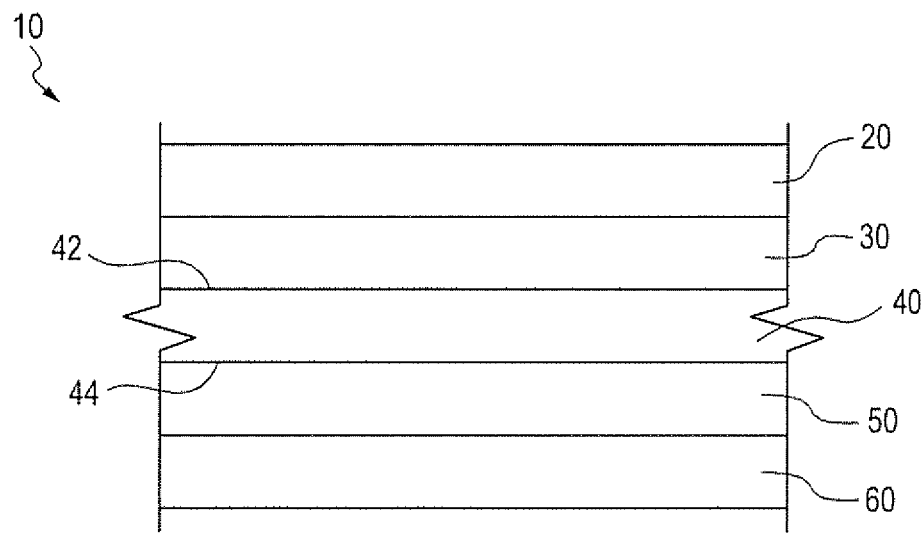
FIG. 1 is a schematic cross sectional view of an embodiment of a viscoelastic damping material laminate or tape in accordance with the present subject matter.

The present subject matter provides viscoelastic damping material laminates (which may also be referred to herein as tapes) which exhibit relatively high vibration damping characteristics, which may be described as damping efficiency as described herein. In particular versions of the tapes, the tapes are relatively thin and/or lightweight as compared to many currently known vibration damping tapes. The viscoelastic damping material laminates are provided in a variety of configurations including a single substrate configuration and a multilayer configuration utilizing two or more substrates. Each configuration includes at least two (2) layers of viscoelastic damping material and optional release liners at least partially disposed on the viscoelastic damping material face(s). In some embodiments, the tape may include additional viscoelastic damping layers. In one embodiment, the tape may include at least three (3) layers of both viscoelastic damping material and substrate at least partially disposed on the surface of viscoelastic damping material face(s). In some embodiments, the tape may include at least four (4) layers of both viscoelastic damping material and substrate at least partially disposed on the surface of viscoelastic damping material face(s). In some embodiments, the tape may include at least five (5) layers of both viscoelastic damping material and substrate at least partially disposed on the surface of viscoelastic damping material face(s). In some embodiments, the tape may include at least six (6) layers of both viscoelastic damping material and substrate at least partially disposed on the surface of viscoelastic damping material face(s). Although many embodiments described herein refer to a first and second layer of viscoelastic damping materials, any additional layers may also have these embodiments. In still other embodiments, the viscoelastic damping material(s) can exhibit at least one compositional gradient or region such as along the viscoelastic damping material thickness.

In some embodiments, compositional gradients or regions may provide a gradual change in material properties from one surface to another surface of the viscoelastic damping material(s). The additional viscoelastic damping layers may be disposed upon each other or disposed on at least one substrate. The present subject matter also provides constrained layer systems utilizing the viscoelastic damping material laminates.

Substrates

The tapes of the present subject matter utilize one or more substrates. Although specific embodiments of a single substrate tape and a dual substrate tape are described herein, it will be understood that the present subject matter tapes include tapes having additional substrates, including three substrates, four substrates, five substrates, and six or more substrates. The additional substrates may be disposed upon each other or disposed on at least one viscoelastic damping layer. In some embodiments, the substrates may be multilayer and at least partially disposed on each other. In tapes utilizing a plurality of substrates, typically a layer of viscoelastic damping material is at least partially disposed between adjacent substrates. For example, in one embodiment of the present subject matter, a tape is provided comprising five substrates in which a layer of viscoelastic damping material is at least partially disposed between adjacent substrates, and a fifth layer of viscoelastic damping material is at least partially disposed along a face of one of the outermost substrates.

The substrates used in the viscoelastic damping material laminates of the present subject matter are relatively thin, i.e., have a thickness within a range of from about 5 μm to about 3,000 μm, in many embodiments from about 10 μm to about 500 μm, and in certain embodiments have a thickness of about 125 μm or about 250 μm. In some embodiments, the substrates have a range of room temperature Young's Modulus of about 1 GPa to about 1000 GPa, in other embodiments from about 20 GPa to about 500 GPa, and in certain embodiments from about 40 GPa to about 200 GPa. In some embodiments, the substrate is a metal foil that may have a room temperature Young's Modulus of at least 20 GPa.

In many embodiments, the substrates may be comprised of or are in the form of a metal foil. In some embodiments, there may be more than one substrate metal foil (which may be referred to as a first metal foil, a second metal foil, a third metal foil, etc.). Generally, any metal foil (including a first metal foil, a second metal foil, a third metal foil, etc.) can be used, including ferrous and nonferrous based foils. A wide array of metals can be used such as, but not limited to, Aluminum, Copper, Tin, Brass, Gold, Silver, Nickel, Steel, Stainless Steel, mixtures and/or alloys of these with other metals and/or agents. In many embodiments, an Aluminum foil is used. However, it is contemplated that other metals and/or combinations of metals may be used including Columbium/Niobium, Hafnium, Iridium, Molybdenum and alloys, Rhenium and alloys, Tantalum, Tungsten and alloys, Platinum, Platinum and Iridium, Alloy 42 and 52, Hastelloy, Inconel, Invar 36®, Kovar®, Monel, Nichrome/Tophet "A," Phosphor Bronze, Titanium, Vanadium, Zirconium, and combinations thereof.

The present subject matter may include the use of coated metal foils and metal foils comprising one or more metals in combination with one or more agents. It is also contemplated that instead of, or in addition to, one or more metal foils for a substrate of the viscoelastic damping material laminate, one or more polymeric films or coatings could be utilized. In one embodiment, the metal foil may comprise metalized film.

The present subject matter also may comprise other materials for the substrate(s) such as heterogeneous layers or regions. In some embodiments, the substrate(s) may comprise one or more adjuvants dispersed in a matrix material. The adjuvants may, for example, be in the form of particles, platelets, fibers, geometrically shaped materials, and/or sheet-like regions of a first material different in chemical composition from the matrix material. A particular example of a heterogeneous layer is a carbon fiber film. In another embodiment, a heterogeneous layer may comprise a polymer composite with at least one layer of fiberglass or carbon fiber. In one example, the fiberglass may be impregnated with epoxy. In another example, the fiberglass may be FR-4 (also known as FR4). In some embodiments, the selection of the adjuvant(s) and of the matrix material and extent of dispersal of the adjuvant(s) within the matrix material enables specific tailoring of the physical properties and characteristics of the heterogeneous layer(s) which may be used as substrate(s). In still other embodiments, the substrate(s) can utilize foils that exhibit compositional gradients or regions such as along the foil thickness. In some embodiments, compositional gradients or regions may provide a gradual change in material properties from one surface to another surface. The metal foil may be a differential foil having a first ferrous region of ferrous foil and a second region of a non-ferrous based foil. In some embodiments, a differential foil could be used having two or more regions of a ferrous composition or ferrous-based composition, in combination with two or more regions of a nonferrous composition or nonferrous-based composition.

Viscoelastic Damping Materials

Each of the viscoelastic damping material layer(s) used in the viscoelastic damping material laminate of the present subject matter are relatively thin. In many embodiments, the relatively thin viscoelastic damping material laminate may have a thickness within a range of from about 2 μm to about 5,000 μm, in many embodiments from about 10 μm to about 1,000 μm, and in certain embodiments have a thickness of about 125 μm. In some embodiments, at least one of the first layer of viscoelastic damping material and the second layer of viscoelastic damping material may comprise a viscoelastic damping material selected from the group comprising, but are not limited to, elastomers, butyl rubber, styrenic block copolymer (known as SBCs, for example, Kraton), polyurethanes, silicone rubbers, nitrile rubber, isoprene, butadiene, viscoelastic polymer gels, pressure sensitive adhesives (for example, silicone, rubber, acrylic), non-pressure sensitive adhesives, asphaltic materials (for example, roofing adhesives and mastics), and combinations of these. In many embodiments, these viscoelastic damping materials may have a modulus dependent on both temperature and frequency that may provide efficient damping at about their glass transition. In other embodiments, both the first layer of viscoelastic damping material and the second layer of viscoelastic damping material may comprise a viscoelastic damping material selected from the group comprising, but are not limited to, elastomers, butyl rubber, styrenic block copolymer (known as SBCs, for example, Kraton), polyurethanes, silicone rubbers, nitrile rubber, isoprene, butadiene, viscoelastic polymer gels, pressure sensitive adhesives (for example, silicone, rubber, acrylic), non-pressure sensitive adhesives, asphaltic materials (for example, roofing adhesives and mastics), and combinations of these. In many embodiments, these viscoelastic damping materials may have a modulus dependent on both temperature and frequency that may provide efficient damping about their glass transition. In many embodiments, the viscoelastic damping materials may have a tan delta maximum greater than about 0.5 at the temperature and frequency of the damping application. In some embodiments, the temperature range measured by dynamic mechanical analyzer (DMA) at 10 rad/s may be about −120° C. to about 200° C., in many embodiments −80° C. to about 100° C., and in some embodiments about −60° C. to about 75° C.

The viscoelastic damping materials used in the tapes of the present subject matter may exhibit viscoelastic properties at temperatures corresponding to the tape applications. Generally, the tapes are used, and/or designed for applications within a temperature range of from −30° C. to 150° C. In some embodiments, the present subject matter also includes tapes for use at temperatures which may be less than −30° C. and/or greater than 150° C.

In many embodiments, the adhesives comprise pressure sensitive adhesives (PSAs). However, the present subject matter may also include the use of adhesives which are not pressure sensitive adhesives or "non-PSA's." For example, non-pressure sensitive adhesives may include, but are not limited to, heat seal adhesives, thermal bond films, B-stage adhesives, two-stage adhesives, dry adhesives, and combinations of these.

The pressure sensitive adhesive materials that can be used in the vibration damping adhesive tapes include rubber based adhesives, acrylic adhesives, vinyl ether adhesives, silicone adhesives, and/or mixtures of two or more thereof. Included are the pressure sensitive adhesive materials described in "Adhesion and Bonding", Encyclopedia of Polymer Science and Engineering, Vol. 1, pages 476-546, Interscience Publishers, 2nd Ed. 1985, the disclosure of which is hereby incorporated by reference. The pressure sensitive adhesive materials may comprise as a major constituent an adhesive polymer such as natural, reclaimed or styrene butadiene rubber, tackified natural or synthetic rubbers, styrene butadiene or styrene isoprene block copolymers, random copolymers of ethylene and vinyl acetate, ethylene-vinyl-acrylic terpolymers, polyisobutylene, poly(vinyl ether), poly(acrylic) ester, etc. The pressure sensitive rubber and acrylic adhesive materials are typically characterized by glass transition temperatures in the range of about −70° C. to about 20° C. The pressure sensitive silicone adhesive materials are typically characterized by glass transition temperatures in the range of about −20° C. to about 100° C.

The acrylic adhesives may comprise as a major constituent acrylic type polymers containing carboxylic acids which are obtained from vinyl type monomers containing carboxyl groups such as acrylic acid, methacrylic acid, etc., and acrylic type polymers containing hydroxyl groups which are obtained from vinyl type monomers containing hydroxyl groups such as 2-hydroxyethyl methacrylate, etc. In one embodiment, the acrylic adhesive material is obtained from the copolymerization of an alkyl acrylate such as butyl acrylate, 2-ethylhexyl acrylate, or isononyl acrylate; a polar monomer such as acrylic acid, acrylamide, or N-vinyl-2-pyrrolidone, and another monomer such as an acrylate other than the acrylate mentioned above, methacrylate, styrene, vinyl acetate, etc.

Other materials in addition to the foregoing resins may be included in the pressure sensitive adhesive materials. These may include, but are not limited to, solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers).

In many embodiments, the viscoelastic damping materials exhibit, in addition to improved vibration damping characteristics, beneficial adhesion characteristics such as relatively high adhesion, good shear resistance, good temperature resistance, good chemical resistance, weatherability and resistance to environmental agents including UV radiation, good holding power, adhesion to low surface energy substrates, and adhesion to non-pristine surfaces such as dirty or oily surfaces, as may be found in certain automotive applications.

In some embodiments, the first layer of viscoelastic damping material and the second layer of viscoelastic damping material in the present subject matter can have the same chemical composition. In other embodiments, the first layer of viscoelastic damping material and the second layer of viscoelastic damping material in the present subject matter may utilize different chemical compositions. In other embodiments, all layers of viscoelastic damping material (where there are at least three layers of viscoelastic damping materials) may have the same chemical composition. In another embodiment, all layers of viscoelastic damping material (where there are at least three layers of viscoelastic damping materials) may have different chemical compositions.

The viscoelastic damping material layers (referring to both the first layer of viscoelastic damping material and the second layer of viscoelastic damping material) in the present subject matter tapes can be continuous or substantially continuous. In many embodiments, the viscoelastic damping material layers are continuous and exhibit a uniform thickness. In some embodiments, the viscoelastic damping material layers may be substantially continuous where the layer(s) may be not uniform, such as unintentional defects or voids.

Release Liner(s)

The viscoelastic damping material laminates of the present subject matter optionally comprise one or more release liner(s) at least partially covering or disposed on the viscoelastic damping material layer(s). Generally, in many embodiments, a first release liner is at least partially disposed on and covering a face of a first viscoelastic damping material layer of viscoelastic damping material. Optionally, a second release liner may be at least partially disposed on and covering a face of a second layer of viscoelastic damping material. The present subject matter includes the use of a multi-component release liner assembly such as a plurality of release liners at least partially covering a region of an otherwise exposed viscoelastic damping material layer. In certain embodiments, the tapes may comprise a plurality of release liners, a single release liner, or be free of release liner(s).

Release liners for use in the present subject matter may be those known in the art. Various release liners are available that may be applied to the viscoelastic damping material and are useful in protecting the viscoelastic damping material from inadvertently bonding prior to use. Suitable release liners are described in some detail in Chapter 23 of the Handbook of Pressure Sensitive Adhesive Technology, 2nd Ed., edited by Donatas Satas. Various release liners known in the art are suitable as long as they are selected for their release characteristics relative to the viscoelastic damping material chosen for use in the present subject matter.

Composite Loss Factor and Damping Efficiency

As provided herein, damping performance may be measured using CLF (composite loss factor) over a certain temperature range at a reference frequency of at least 50 Hz. In some embodiments, 200 Hz may be used as the reference frequency. In some embodiments, a laminate construction may be considered to be damping when the CLF is at least 0.10 at a frequency of 200 Hz at the temperature range of the application. The temperature range of the application may be about −50° C. to about 200° C. In some embodiments, a laminate construction may be considered to be damping when the CLF is at least 0.05 when measured over a temperature range of 15° C. at a frequency of 200 Hz. As described herein, the span for the temperature range of 15° C. may occur from about −50° C. to about 200° C. In other embodiments, a laminate construction may be considered to be damping when the CLF is at least 0.10 when measured over a temperature range of 15° C. at a frequency of 200 Hz where the span for the temperature range of 15° C. may occur from about −50° C. to about 200° C.

In other embodiments, the damping properties of laminate constructions may be based on the damping efficiency index (described below). In one embodiment, a laminate construction may have a damping efficiency index of at least greater than 2000 at frequencies of at least about 50 Hz. In another embodiment, a laminate construction may have a damping efficiency index of at least greater than 2000 at frequencies of about 50 Hz to about 5000 Hz.

As used herein, damping efficiency is a measure of the composite loss factor (CLF) height and width normalized by its thickness and mass. For damping efficiency, the performance of different tapes may be evaluated using the linear-density normalized damping efficiency index, $\zeta = (W \times M)/(\rho_A \times t)$ (with units of °C./(kg/m)), where, W is the width of the CLF curve for CLF≥0.10 (in °C.), M is the maximum value of measured CLF, $\rho_A$ is mass per unit area (kg/m²) and t is the thickness of the total construction (m). In some embodiments of what is disclosed herein, samples with improved damping may have a linear-density normalized damping efficiency index ($\zeta$ $\zeta$) that is greater than at least $2.0 \times 10^3$.

FIGURES

FIG. 1 is a schematic cross sectional view of an embodiment of a tape 10 in accordance with the present subject matter. The tape 10 comprises a substrate 40 defining a first face 42 and an oppositely directed second face 44. The tape 10 also comprises a first layer of viscoelastic damping material 30 at least partially disposed on or along the first face 42 of the substrate 40. The tape 10 additionally comprises a second layer of viscoelastic damping material 50 at least partially disposed on or along the second face 44 of the substrate 40. The tape 10 may also comprise one or more optional release liner(s) such as a release liner 20 at least partially disposed on and covering the first layer of viscoelastic damping material 30 and/or a release liner 60 at least partially disposed on and covering the second layer of viscoelastic damping material 50.

Figure 2:
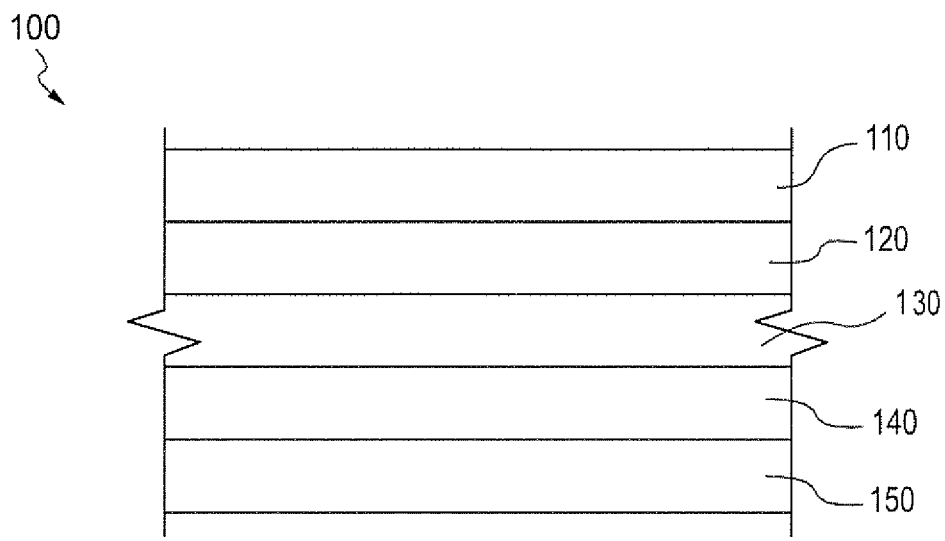
FIG. 2 is a schematic cross sectional view of another embodiment of a viscoelastic damping material laminate or tape in accordance with the present subject matter.

FIG. 2 is a schematic cross sectional illustration of another embodiment of a tape 100 in accordance with the present subject matter. The tape 100 comprises a first substrate 110, a second substrate 130, a first layer of viscoelastic damping material 120 at least partially disposed between the first and second substrates 110 and 130, and a second layer of viscoelastic damping material 140. The second substrate 130 is at least partially disposed between the first layer of viscoelastic damping material 120 and the second layer of viscoelastic damping material 140. The tape 100 also comprises an optional release liner 150 at least partially disposed on or along the second viscoelastic damping material layer of viscoelastic damping material 140.

Tape Forms

The tapes of the present subject matter can be provided in a variety of different forms. In many embodiments, the tapes are provided in a roll form, however other forms are included such as sheet forms and Z-fold forms.

Applications and Constrained Layer Systems

As noted, the tapes of the present subject matter will find wide application for damping vibration. When applied, i.e., adhered to the first component, a constrained layer system is formed. The tapes of the present subject matter may also be applied (i.e. adhered) to an optional second component. Upon the first component and optional second component undergoing vibration, the tape and particularly the viscoelastic damping material layer(s) of the tape dampen or reduce the vibration. Although not wishing to be limited to any particular frequency or range of frequencies, the tapes of the present subject matter will find use in damping vibrations of at least 50 Hz. In other embodiments, the tapes of the present subject matter may dampen vibrations within a frequency range of from about 50 Hz to about 15,000 Hz, more typically from about 100 Hz to about 5,000 Hz, and in particular applications from about 200 Hz to about 3,000 Hz.

The tapes of the present subject matter can potentially be used in any application in which it is desired to dampen vibration by forming a constrained layer system by adhering the tape to a first component exhibiting or undergoing vibration and optionally, a second component of the system.

The tapes of the present subject matter can also potentially be used in any application in which it is desired to dampen vibration by forming a constrained layer system by adhering (i.e. applying) the tape to at least one of the first component and the second component of the system exhibiting or undergoing vibration. Non-limiting examples include automotive applications, electronic applications, incorporation in power tools, aerospace applications, incorporation in domestic appliances such as in washers, dryers, dishwashers, and in industrial equipment such as motor housings and pump housings. Specific non-limiting examples of automotive applications include automotive door panels, brake components including brake pads and brake shims, roofs, floors, heat shields, frames and frame components, firewalls, and suspension components. A non-limiting example of an electronic application is damping vibration associated with a hard disk drive (HDD).

Figure 3:
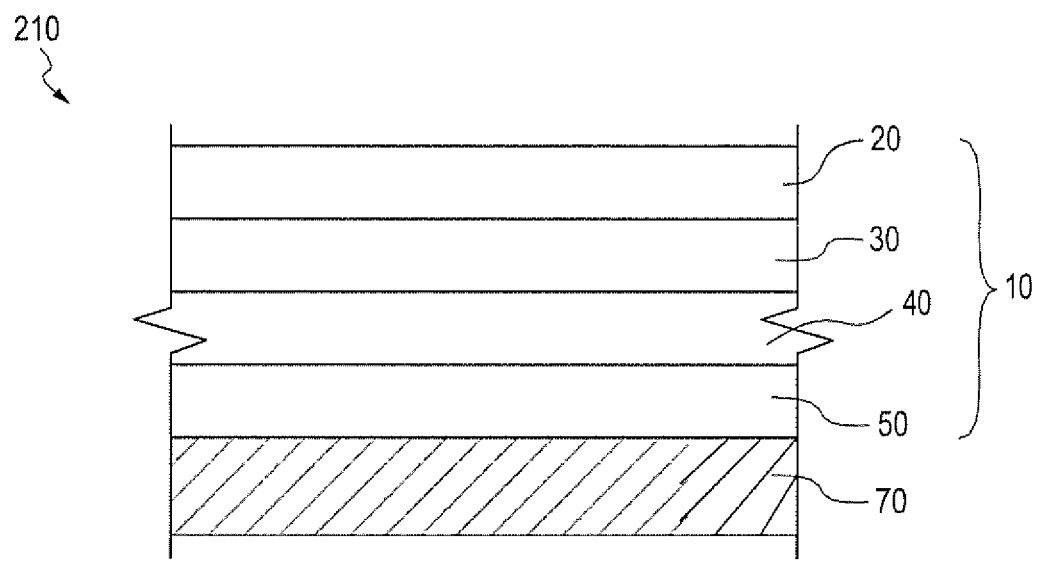
FIGS. 3 and 4 are schematic cross sectional views of constrained layer systems using the tapes of FIG. 1.
Figure 4:
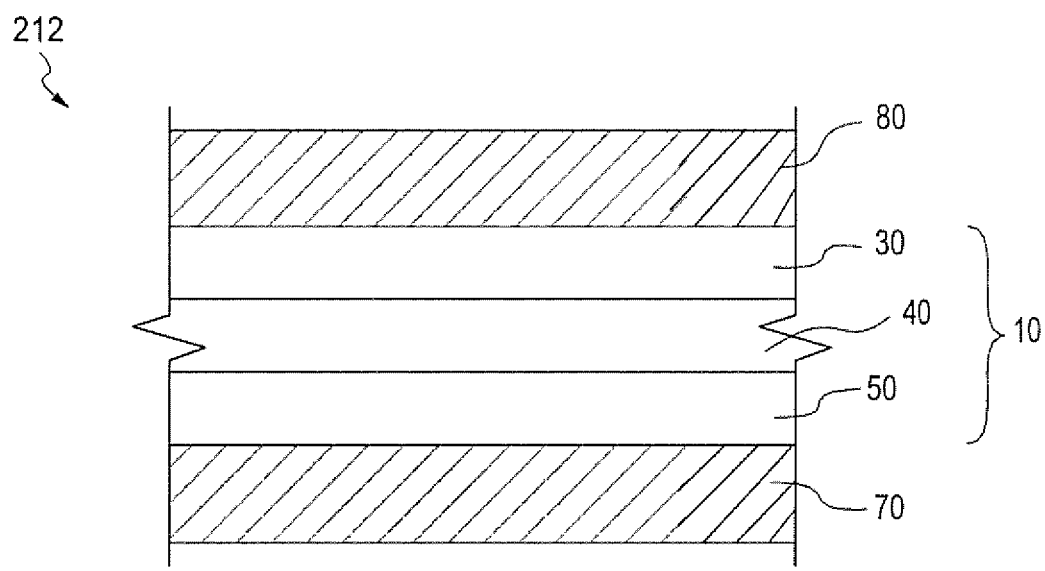

FIGS. 3 and 4 are schematic cross sectional views of constrained layer systems using the tape 10 previously described in association with FIG. 1. The constrained layer system 210 depicted in FIG. 3 comprises the tape 10 (comprised of a substrate 40, a first layer of adhesive 30, and a second layer of adhesive 50) having one of its release liners removed (e.g., release liner 60 shown in FIG. 1), and the tape 10 being at least partially adhered via viscoelastic damping material layer 50 to a second component 70 undergoing vibration or potential vibration to be damped. The constrained layer system 212 shown in FIG. 4 comprises the tape 10 having both of its release liners removed (e.g., release liners 20 and 60 shown in FIG. 1), and the tape 10 being adhered via a second layer of viscoelastic damping material layer 50 to a second component 70 undergoing vibration or potential vibration to be damped, and adhered via the first layer of viscoelastic damping material 30 to a first component 80 undergoing vibration or potential vibration to be damped. Referring further to FIG. 4, it will be understood that the first component 80 and/or the second component 70 could in many applications be in the form of an acoustic absorbing material such as a foam. The resulting assembly would provide both vibration damping and acoustic absorption. It is also understood that additional layers of substrates and/or layers of adhesive may be added in FIGS. 3 and 4.

Figure 5:
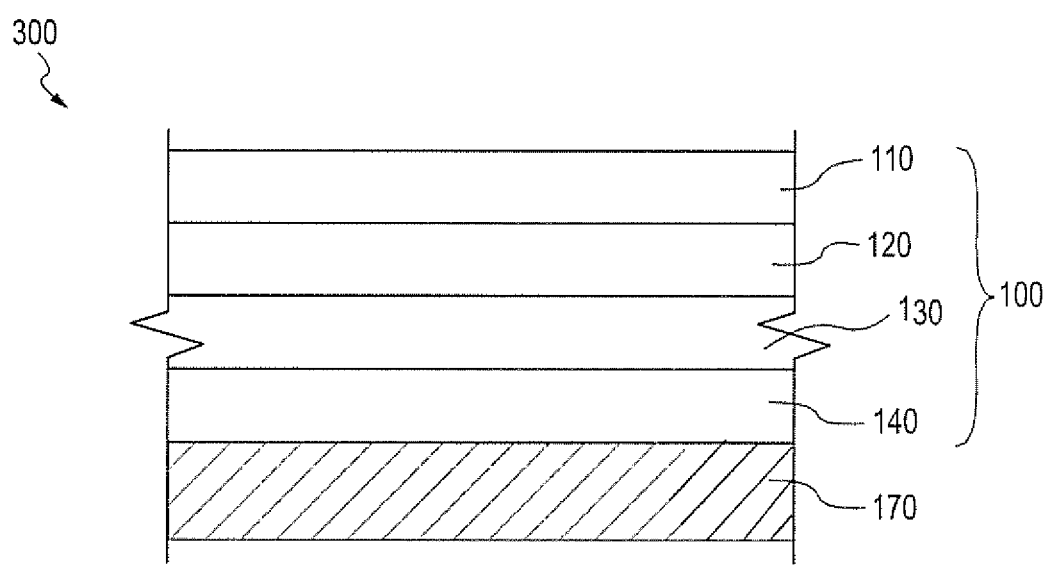
FIG. 5 is a schematic cross sectional view of a constrained layer system using the tapes of FIG. 2.

FIG. 5 is a schematic cross sectional view of a constrained layer system using the tape 100 previously described in association with FIG. 2. The constrained layer system 300 comprises the tape 100 having its release liner removed (e.g., release liner 150 shown in FIG. 2), and the tape 100 being adhered via a second layer of adhesive 140 (also referred to as a second layer of viscoelastic damping material herein) to a second component 170 undergoing vibration or potential vibration to be damped. In FIG. 5, the first substrate is exposed and not adhered or bonded to another substrate, viscoelastic damping material, or component. Conversely (but not shown in FIG. 5), the tape may be adhered vis a first layer of adhesive (also referred to as a first layer of viscoelastic damping material herein) to a first component undergoing vibration or potential vibration to be damped where the second substrate is exposed and not adhered or bonded to another substrate, viscoelastic damping material, or component. It is also understood that additional layers of substrates and/or layers of adhesive may be added in FIG. 5, where a substrate is still exposed and not adhered or bonded to another substrate, viscoelastic damping material, or component.

The embodiments described in FIGS. 1-5 provide examples of a configuration described herein. It is understood that the present subject matter may include tapes having additional substrates, including three substrates, four substrates, five substrates, and six or more substrates. The additional substrates may be disposed upon each other or disposed on at least one viscoelastic damping layer. It is also understood that the present subject matter may include tapes having additional viscoelastic damping layers, including three viscoelastic damping material layers, four viscoelastic damping material layers, five viscoelastic damping material layers, or six or more viscoelastic damping material layers. The additional viscoelastic damping layers may be disposed upon each other or disposed on at least one substrate.

Figure 6:
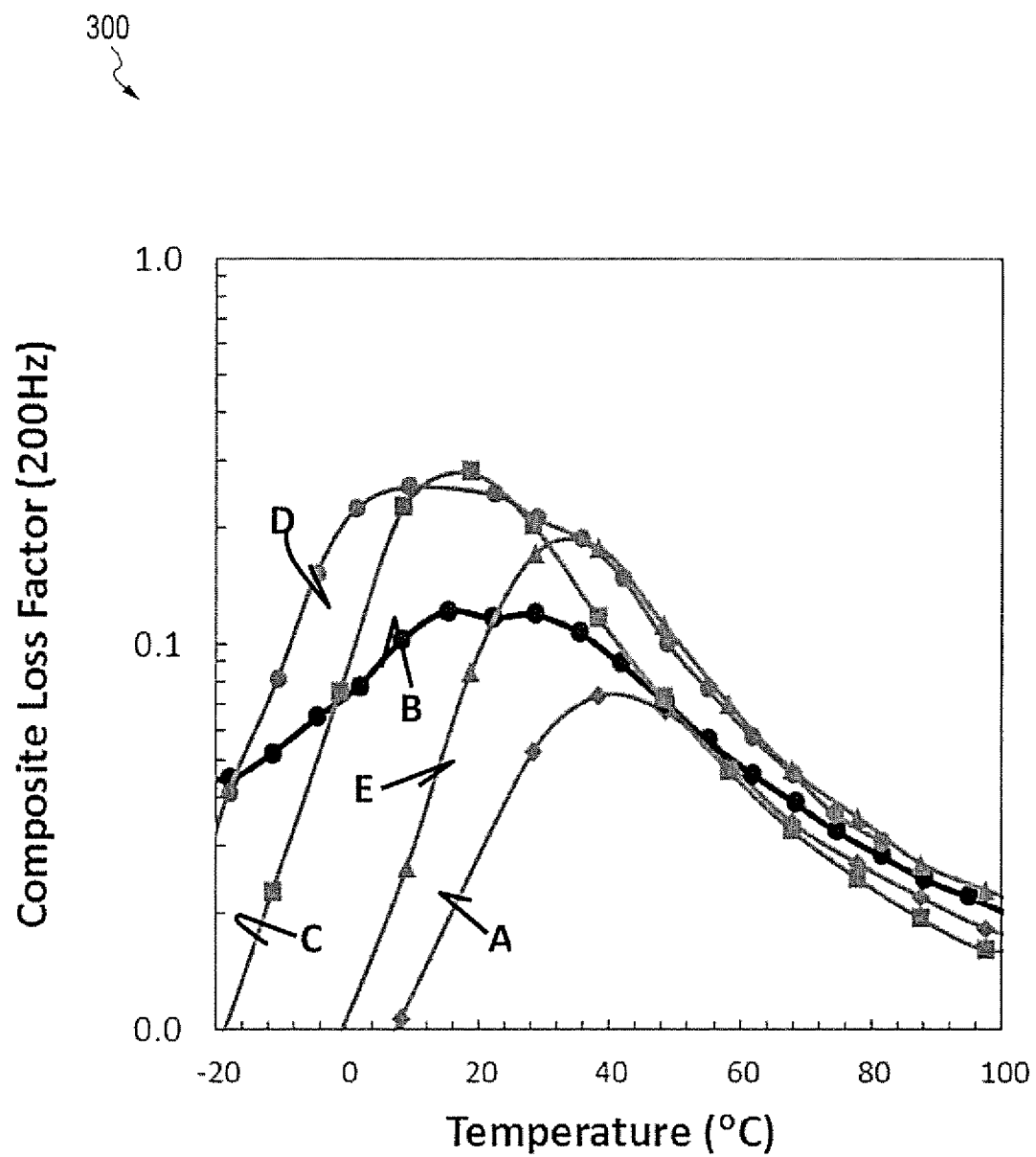
FIG. 6 is a graph of composite loss factor as a function of temperature for a tape in accordance with the present subject matter as compared to two prior art tapes.
Figure 7:
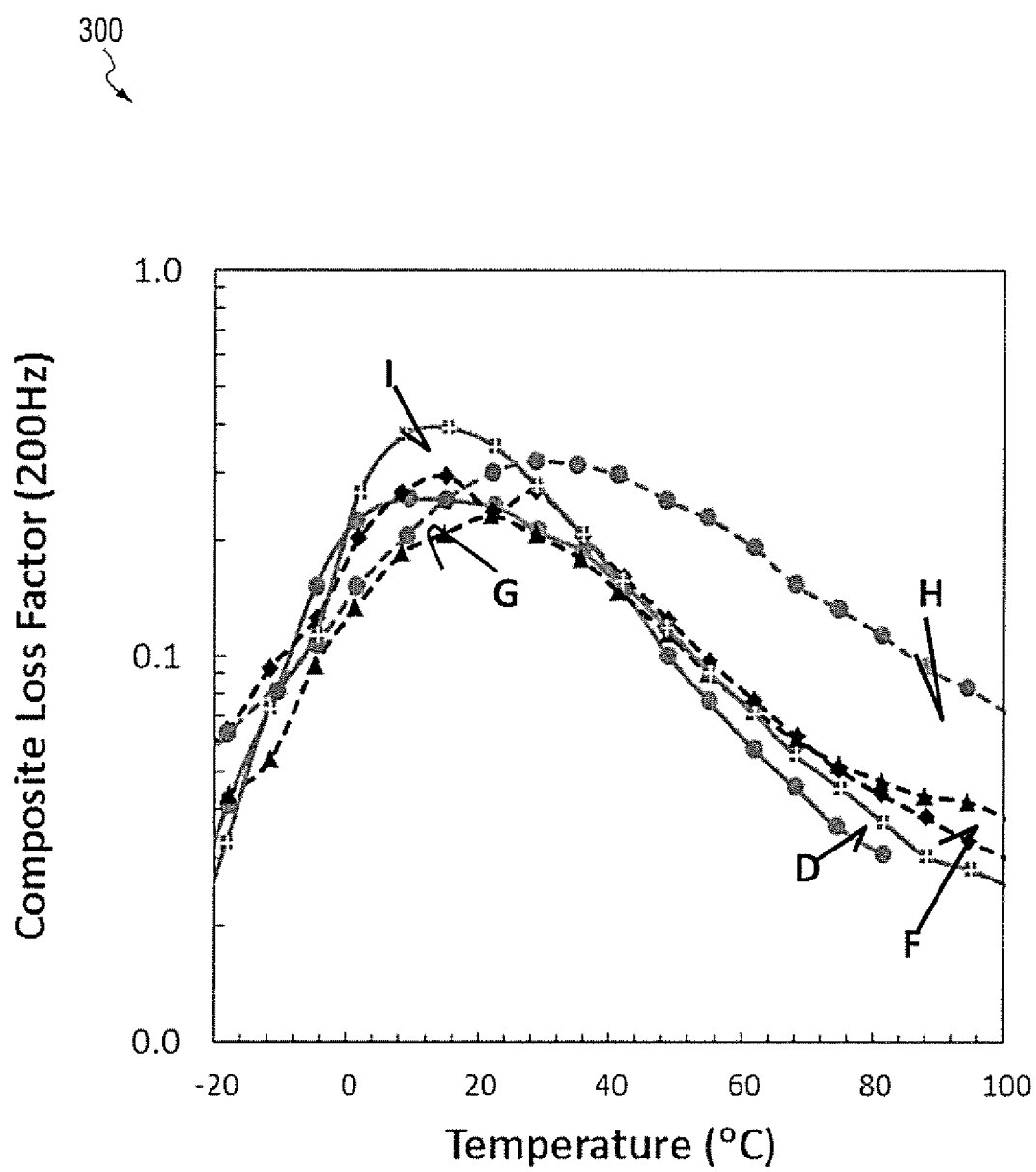
FIG. 7 is a graph of composite loss factor as a function of temperature for a tape in accordance with the present subject matter as compared to two prior art tapes.
Figure 8:
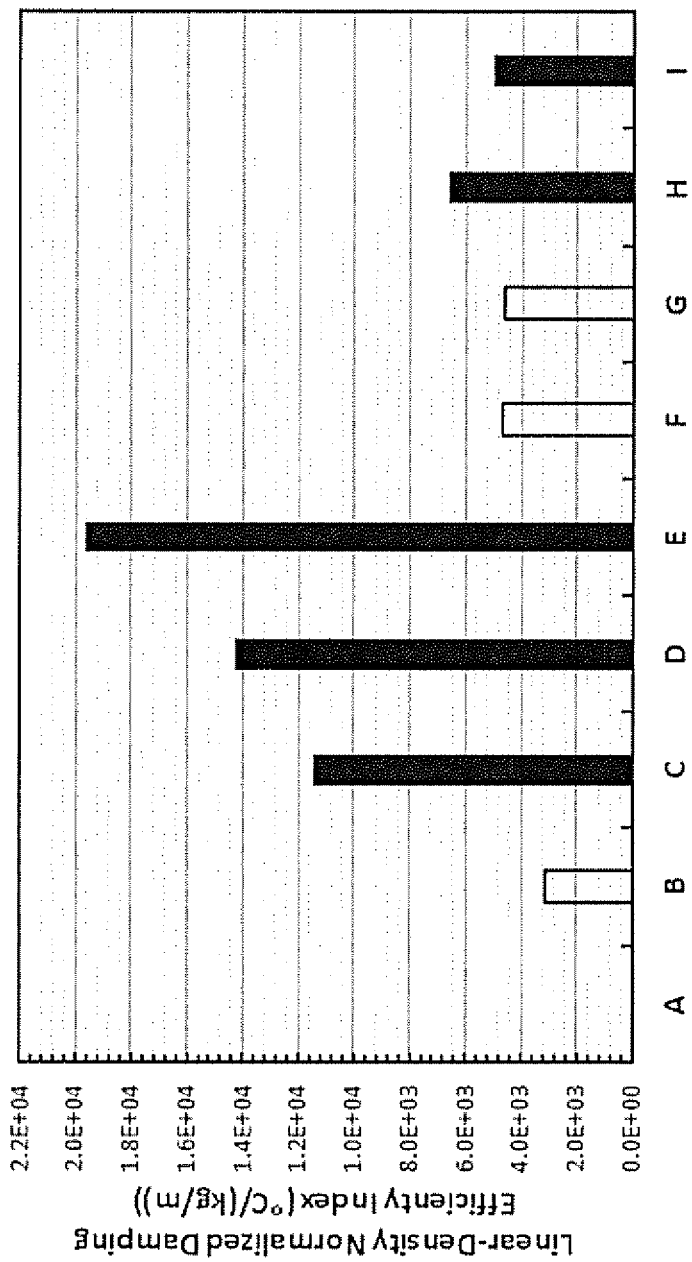
FIG. 8 is a graph of a linear-density normalized damping efficiency index for a tape in accordance with the present subject matter as compared to commercially available tapes.

FIGS. 6, 7, and 8 are described below in the Examples.

EXAMPLES

Vibration damping characteristics of several adhesive tapes in accordance with the present subject matter were compared to the vibration damping characteristics of commercially available vibration damping adhesives tapes. For the commercially available vibration damping adhesive tapes, the laminates described herein were evaluated at similar thicknesses in some embodiments. In some instances, varying thicknesses were evaluated to demonstrate both the increased vibration damping efficiency index and CLF. Specifically, a tape available from Avery Dennison under the designation UHA 0806 was obtained and designated as Sample A. The UHA 0806 tape includes an aluminum foil with a single layer of acrylic adhesive (as the viscoelastic damping material) at least partially disposed on one face of the aluminum foil. The UHA 0806 tape utilizes an adhesive layer coat weight of 125 $g/m^2$ and has total thickness of 0.25 mm. The total product mass per unit area for the UHA 0806 tape is 0.45 $kg/m^2$. This is the mass per unit area for the full tape, i.e., adhesive plus foil.

Another tape similar to the construction of Sample A, from Dynamic Control of North America, Inc. under the designation DYNAMAT SUPERLITE was obtained and designated as Sample B. The DYNAMAT SUPERLITE tape includes a 0.06 mm aluminum foil and a single layer of adhesive (as he viscoelastic damping material) on one face of the foil. The DYNATMAT SUPERLITE tape utilizes a relatively high coat weight black butyl adhesive with a total product mass per unit area of 1.50 $kg/m^2$ and total thickness of 1.10 mm.

A tape in accordance with the present subject matter and having a configuration corresponding to that shown in FIG. 2 was prepared and designated as Sample C, which has a total mass of 1.50 $kg/m^2$. That tape utilized an acrylic adhesive for each of the two adhesive layers (as the viscoelastic damping material), each adhesive layer having a coat weight of 125 $g/m^2$ and a thickness of 0.125 mm and each adhesive layer having the same chemical composition. That tape also utilized an aluminum foil for each of the substrates, each foil layer having a thickness of 0.250 mm.

A tape in accordance with the present subject matter and having a configuration corresponding to that shown in FIG. 2 was prepared and designated as Sample D, which has a total mass of 1.50 $kg/m^2$. That tape utilized an acrylic adhesive for each of the two adhesive layers (as the viscoelastic damping material), each adhesive layer having a coat weight of 125 $g/m^2$ and a thickness of 0.125 mm and each adhesive layer having different chemical composition. That tape also utilized an aluminum foil for each of the substrates, each foil layer having a thickness of 0.250 mm.

A tape in accordance with the present subject matter and having a configuration corresponding to that shown in FIG.

2 was prepared and designated as Sample E, which has a total mass of 0.90 kg/m². That tape utilized an acrylic adhesive for each of the two adhesive layers (as the viscoelastic damping material), each adhesive layer having a coat weight of 125 g/m² and a thickness of 0.125 mm. That tape also utilized an aluminum foil for each of the substrates, each foil layer having a thickness of 0.125 mm.

Each of the tape samples A, B, C, D and E was adhered to a component which was then subjected to vibration over a range of temperatures. The Composite Loss Factor (CLF) was then determined for each system. As is known in the art, a CLF value is an indication of a tape's (or other construction) damping ability. In general, the greater the value of the CLF at a given temperature, the greater the ability of the tape to dampen or reduce vibration at that temperature. The CLF measurements for each sample were obtained from a vibrating beam test (VBT) using specification SAE J1637 with 0.75 mm thick Sendimizer steel as the base layer (component) and the results are reported at a reference frequency of 200 Hz.

As evident in the graph of FIG. 6, the tape Sample D exhibited higher CLF values over a relatively wide range of temperatures as compared to currently available tapes, i.e., Sample A and Sample B. Sample C exhibited a slightly higher peak CLF than Sample D and has a higher peak CLF than Sample B, and an overall higher CLF over the temperature range evaluated than Sample A. Sample E exhibited comparable CLF values to that of Sample B. Samples C, D, and E are all thinner and lighter than or equivalent in weight to Sample B. The present subject matter allows for construction of tapes having equivalent thickness and weight profiles, if not, thinner and lighter profiles, than currently available tapes, with broader and/or higher CLF values as a function of temperature (as seen in FIG. 6).

Another tape, of thickness and weight higher than Samples A-E, from Dynamic Control of North America, Inc. under the designation DYNAMAT XTREME was obtained and designated as Sample F. The DYNAMAT XTREME tape includes a 0.10 mm aluminum foil and a single layer of adhesive on one face of the foil. The DYNAMAT XTREME tape utilizes a relatively high coat weight black butyl adhesive with total product mass per unit area of 2.50 kg/m² and total thickness of 1.7 mm.

Another tape, of thickness and weight equivalent to Sample F, from Sika Corporation, under the designation SikaDamp 630 was obtained and designated as Sample G. The SikaDamp 630 tape includes a 0.08 mm aluminum foil and a single layer of adhesive on one face of the foil. The SikaDamp 630 tape utilizes a relatively high coat weight black butyl adhesive with a total product mass per unit area of 2.00 kg/m² and total thickness of 1.5 mm.

A tape in accordance with the present subject matter and having a configuration corresponding to that shown in FIG. 2 was prepared and designated as Sample H. That tape utilized an acrylic adhesive for each of the two adhesive layers, each adhesive layer having a thickness of 1.0 mm. That tape also utilized an aluminum foil for each of the substrates, each foil layer having a thickness of 0.125 mm.

A tape in accordance with the present subject matter and having a configuration comprising of two layers of Sample C was prepared and designated as Sample I. That tape utilized an acrylic adhesive for each of the four adhesive layers (as the viscoelastic damping material), each adhesive layer having a coat weight of 125 g/m² and a thickness of 0.125 mm. That tape also utilized an aluminum foil for each of the four substrates, each foil layer having a thickness of 0.25 mm.

As evident in the graph of FIG. 7, the tape Sample D exhibited comparable CLF values over a relatively wide range of temperatures as compared to currently available tapes, i.e., Sample F and Sample G. However, Sample D is both thinner and lighter than Sample F and G. Sample H has higher CLF values over the entire temperature range studied than the CLF values of currently available tapes, i.e., Sample F and Sample G. However, Sample H has mass per unit area comparable to that of Sample F and Sample G. Sample I exhibits the highest maximum in CLF amongst all the samples studied. Therefore, this present subject matter provides damping constructions that allows for both higher CLF values as well as broader (or comparable in breadth) CLF value as a function of temperature with reduced tape thickness and reduced tape mass per unit area.

FIG. 8 provides a measure of damping efficiency, calculated at 200 Hz, as described herein. FIG. 8 provides plots of the linear-density normalized damping efficiency index ($\zeta$) for Samples A through I. With currently available samples (Sample A, B, F and G), the linear-density normalized damping efficiency index ($\zeta$) is less than about $4.5 \times 10^3$. For the products disclosed (Samples C, D, E, H, and I), the linear-density normalized damping efficiency index ($\zeta$) is greater than at least about $4.5 \times 10^3$. For products with a more optimized surface density for maximal temperature-dependent damping (those with $\zeta$ is greater than at least about $4.5 \times 10^3$), the linear-density normalized damping efficiency index is increased. For instance, Sample A has the linear-density normalized damping efficiency index ($\zeta$) at about 0 because its peak CLF is less than 0.10 (FIG. 6) despite being light. Sample F and Sample G, despite having significant portion of the CLF value greater than 0.10 (see FIG. 7), have $\zeta$ at about $4.4 \times 10^3$ due to their relatively high surface density. In comparison, Samples C, D and E have $\zeta > 1.12 \times 10^4$ by virtue of having comparable or better damping (see FIG. 6) where the samples have about a 50% reduction in surface density. Similarly, comparing Samples H and Sample I to equivalent heavy products like Sample F and Sample G, Sample H and Sample I have at least comparable if not improved damping, as measured by the linear-density normalized damping efficiency index (see FIG. 7 and FIG. 8). In some embodiments (not shown) of what is disclosed herein, samples with improved damping may have a linear-density normalized damping efficiency index ($\zeta$) that is greater than at least $2.0 \times 10^3$.

Many other benefits will no doubt become apparent from future application and development of this technology.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A tape for damping, the tape comprising:
    a substrate defining a first face and an oppositely directed second face;

a first layer of viscoelastic damping material at least partially disposed on the first face of the substrate; and
a second layer of viscoelastic damping material at least partially disposed on the second face of the substrate;
wherein the substrate has a thickness within a range of from about 5 μm to about 3,000 μm, and each of the viscoelastic damping material layers has a thickness within a range of from about 2 μm to about 5,000 μm;
wherein the first layer of viscoelastic damping material and the second layer of the viscoelastic damping material, each comprise a first surface and the second surface; and
wherein the first layer of viscoelastic damping material or the second layer of the viscoelastic damping material or both comprise a compositional gradient providing a gradual change in material properties from the first surface of the viscoelastic damping material to the second surface of the viscoelastic damping material;
wherein the first and second layers of viscoelastic damping material are at least one of continuous and substantially continuous; and
wherein the first layer of viscoelastic damping material and the second layer of viscoelastic damping material are each selected from the group consisting of elastomers, butyl rubber, styrenic block copolymer, polyurethanes, silicone rubbers, nitrile rubber, isoprene, butadiene, viscoelastic polymer gels, pressure sensitive adhesives, non-pressure sensitive adhesives, and combinations thereof.

2. The tape of claim 1 wherein the substrate has a range of room temperature Young's Modulus of about 1 GPa to about 1000 GPa.

3. The tape of claim 1 wherein the substrate has a range of room temperature Young's Modulus of about 20 GPa to about 500 GPa.

4. The tape of claim 1 wherein the substrate comprises a metal foil.

5. The tape of claim 4 wherein the metal foil is a ferrous foil.

6. The tape of claim 4 wherein the metal foil is a nonferrous-based foil.

7. The tape of claim 4 wherein the metal foil is a differential foil having a first region of a ferrous foil and a second region of a non-ferrous based foil.

8. The tape of claim 4 wherein the metal foil comprises aluminum.

9. The tape of claim 1 wherein the pressure sensitive adhesives comprise an acrylic adhesive, a silicone adhesive, a rubber adhesive, a vinyl ether adhesive, and combinations thereof.

10. The tape of claim 1 wherein the first layer of viscoelastic damping material and the second layer of viscoelastic damping material have the same chemical composition.

11. The tape of claim 1 wherein the first layer of viscoelastic damping material and the second layer of viscoelastic damping material have different chemical compositions.

12. The tape of claim 1 further comprising:
at least one release liner at least partially disposed on at least one of the first layer of viscoelastic damping material and the second layer of viscoelastic damping material.

13. The tape of claim 1 further comprising:
a first release liner at least partially disposed on the first layer of viscoelastic damping material; and
a second release liner at least partially disposed on the second layer of viscoelastic damping material.

14. A constrained layer system comprising:
at least one of a first component and a second component undergoing vibration; and
a vibration damping tape comprising (i) a substrate defining a first face and an oppositely directed second face, (ii) a first layer of viscoelastic damping material at least partially disposed on the first face of the substrate, and (iii) a second layer of viscoelastic damping material at least partially disposed on the second face of the substrate,
wherein the substrate has a thickness within a range of from about 5 μm to about 3,000 μm, and each of the viscoelastic damping material layers has a thickness within a range of from about 2 μm to about 5,000 μm;
wherein the first layer of viscoelastic damping material is adhered to the first component;
wherein the first layer of viscoelastic damping material and the second layer of the viscoelastic damping material, each comprise a first surface and the second surface;
wherein the first layer of viscoelastic damping material or the second layer of the viscoelastic damping material or both comprise a compositional gradient providing a gradual change in material properties from the first surface of the viscoelastic damping material to the second surface of the viscoelastic damping material;
wherein the first and second layers of viscoelastic damping material are at least one of continuous and substantially continuous; and
wherein the first layer of viscoelastic damping material and the second layer of viscoelastic damping material are each selected from the group consisting of elastomers, butyl rubber, styrenic block copolymer, polyurethanes, silicone rubbers, nitrile rubber, isoprene, butadiene, viscoelastic polymer gels, pressure sensitive adhesives, non-pressure sensitive adhesives, and combinations thereof.

15. The constrained layer system of claim 14 wherein at least one of the first substrate and the second substrate has a range of room temperature Young's Modulus of about 1 GPa to about 1000 GPa.

16. The constrained layer system of claim 14 wherein at least one of the first substrate and the second substrate has a range of room temperature Young's Modulus of about 20 GPa to about 500 GPa.

17. The constrained layer system of claim 14 wherein the substrate comprises a metal foil.

18. The constrained layer system of claim 17 wherein the metal foil is a ferrous-based foil.

19. The constrained layer system of claim 17 wherein the metal foil is a nonferrous-based foil.

20. The constrained layer system of claim 17 wherein the metal foil is a differential foil having a first region of a ferrous composition and a second region of a nonferrous composition.

21. The constrained layer system of claim 17 wherein the metal foil comprises aluminum.

22. The constrained layer system of claim 14 wherein the pressure sensitive adhesives comprise an acrylic adhesive, a silicone adhesive, a rubber adhesive, a vinyl ether adhesive, and combinations thereof.

23. The constrained layer system of claim 14 wherein the first layer of viscoelastic damping material and the second layer of viscoelastic damping material have the same chemical composition.

24. The constrained layer system of claim 14 wherein the first layer of viscoelastic damping material and the second layer of viscoelastic damping material have different chemical compositions.

25. The constrained layer system of claim 14 wherein the first layer of viscoelastic damping material is adhered to the first component, the system further comprising:

the second layer of viscoelastic damping material is adhered to the second component.

26. The constrained layer system of claim 14 further comprising additional substrates.

27. The constrained layer system of claim 14 further comprising additional viscoelastic damping layers.

28. The constrained layer system of claim 14 wherein the composite loss factor (CLF) is at least about 0.05 over a range of about 15° C. at about 200 Hz.

29. The constrained layer system of claim 14 wherein the composite loss factor (CLF) is at least about 0.10 over a range of about 15° C. at about 200 Hz.

30. The constrained layer system of claim 14 wherein the linear-density normalized damping efficiency index ($\zeta$) is greater than at least $2.0 \times 10^3$ at 200 Hz.

31. The constrained layer system of claim 14 wherein the linear-density normalized damping efficiency index ($\zeta$) is greater than at least $4.5 \times 10^3$ at 200 Hz.

* * * * *